(12) United States Patent
Li et al.

(10) Patent No.: US 7,164,669 B2
(45) Date of Patent: Jan. 16, 2007

(54) MULTI-CARRIER COMMUNICATION WITH TIME DIVISION MULTIPLEXING AND CARRIER-SELECTIVE LOADING

(75) Inventors: Xiaodong Li, Bellevue, WA (US); Hui Liu, Sammamish, WA (US); Hujun Yin, Seattle, WA (US)

(73) Assignee: Adaptix, Inc., Seattle, WA (US)

( * ) Notice: Subject to any disclaimer, the term of this patent is extended or adjusted under 35 U.S.C. 154(b) by 993 days.

(21) Appl. No.: 10/051,348

(22) Filed: Jan. 17, 2002

(65) Prior Publication Data

US 2002/0163879 A1    Nov. 7, 2002

Related U.S. Application Data

(60) Provisional application No. 60/262,828, filed on Jan. 19, 2001.

(51) Int. Cl.
*H04J 3/08* (2006.01)
*H04J 3/16* (2006.01)

(52) U.S. Cl. .................. 370/336; 370/347; 370/465
(58) Field of Classification Search ............. 370/208, 370/329, 330, 337, 347
See application file for complete search history.

(56) References Cited

U.S. PATENT DOCUMENTS

| | | |
|---|---|---|
| 5,479,447 A | 12/1995 | Chow et al. |
| 5,504,775 A | 4/1996 | Chouly et al. |
| 5,515,378 A | 5/1996 | Roy, III et al. |
| 5,555,268 A | 9/1996 | Fattouche et al. |
| 5,708,973 A | 1/1998 | Ritter |
| 5,726,978 A | 3/1998 | Frodigh et al. |
| 5,734,967 A | 3/1998 | Kotzin et al. |
| 5,886,988 A | 3/1999 | Yun et al. |
| 5,887,245 A | 3/1999 | Lindroth et al. |
| 5,914,933 A | 6/1999 | Cimini et al. |
| 5,933,421 A * | 8/1999 | Alamouti et al. ........... 370/330 |
| 5,956,642 A | 9/1999 | Larsson et al. |
| 5,973,642 A | 10/1999 | Li et al. |
| 5,991,273 A | 11/1999 | Abu-Dayya |

(Continued)

FOREIGN PATENT DOCUMENTS

DE    198 00 953 C1    7/1999

(Continued)

OTHER PUBLICATIONS

Gruenheid, R. et al: "Adaptive Modulation and Multiple Access for the OFDM Transmission Technique", Wireless Personal Communications, Kluwer Academic Publishers, NL, vol. 13, NR. ½, Year 2000, pp. 5-13 XP000894156, ISSN:0929-6212.

(Continued)

*Primary Examiner*—Andrew C. Lee
(74) *Attorney, Agent, or Firm*—Fulbright & Jaworski LLP

(57) ABSTRACT

A method for subcarrier allocation and loading for a multi-carrier, multi-subscriber system is described. At least one cluster in a first and second set of clusters of subcarriers is associated for use in communication with a first and second subscriber, respectively. Then, for each cluster associated for use in communication with the first subscriber and the second subscriber, usage of that cluster is multiplexed between the first subscriber during a first time division and the second subscriber during a second time division.

31 Claims, 7 Drawing Sheets

U.S. PATENT DOCUMENTS

| | | | |
|---|---|---|---|
| 6,005,876 | A | 12/1999 | Cimini, Jr. et al. |
| 6,026,123 | A | 2/2000 | Williams |
| 6,041,237 | A | 3/2000 | Farsakh |
| 6,052,594 | A | 4/2000 | Chuang et al. |
| 6,061,568 | A | 5/2000 | Dent |
| 6,064,692 | A | 5/2000 | Chow |
| 6,064,694 | A | 5/2000 | Clark et al. |
| 6,067,290 | A | 5/2000 | Paulraj et al. |
| 6,108,374 | A | 8/2000 | Balachandran et al. |
| 6,131,016 | A | 10/2000 | Greenstein et al. |
| 6,144,696 | A | 11/2000 | Shively et al. |
| 6,226,320 | B1 | 5/2001 | Hakkinen et al. |
| 6,366,195 | B1 | 4/2002 | Harel et al. |
| 6,377,632 | B1 | 4/2002 | Paulraj et al. |
| 6,477,158 | B1 | 11/2002 | Take |
| 6,493,331 | B1 * | 12/2002 | Walton et al. ............... 370/341 |
| 6,545,997 | B1 * | 4/2003 | Bohnke et al. ............. 370/347 |
| 6,947,748 | B1 * | 9/2005 | Li et al. ...................... 455/450 |
| 6,952,454 | B1 * | 10/2005 | Jalali et al. ................. 375/260 |
| 2003/0067890 | A1 | 4/2003 | Goel et al. |
| 2003/0169824 | A1 | 9/2003 | Chayat |

FOREIGN PATENT DOCUMENTS

| | | |
|---|---|---|
| EP | 0 869 647 A2 | 10/1998 |
| EP | 0 926 912 A2 | 6/1999 |
| EP | 0 929 202 A1 | 7/1999 |
| FR | 2 777 407 A1 | 10/1999 |
| GB | 2 209 858 A | 8/1997 |
| JP | 06029922 | 2/1994 |
| WO | WO 98/16077 A2 | 4/1998 |
| WO | WO 98/30047 A1 | 7/1998 |
| WO | WO 02 49305 A2 | 6/2002 |

OTHER PUBLICATIONS

Motegi, M. et al.: "Optimum Band Allocation According to Sub-band Condition for BST—OFDM" 11th IEEE International Symposium on Personal Indoor and Mobile Radio Communications, vol. 2, Sep. 18-21, 2000, pp. 1236-1240, XP002213669, Piscataway, NJ, USA, ISBN:0-7803-6463-5.

Kapoor, S. et al.: "Adaptive Interference Suppression in Multiuser Wireless OFDM Systems Using Antenna Arrays" IEEE Transactions on Signal Processing, vol. 47, No. 12, Dec. 1999, pp. 3381-3391, XP000935422, IEEE, New York, USA, ISSN: 1053-587X.

Ye Li, et al.: "Clustered OFDM with channel estimation for high rate wireless data", Mobile Multimedia Communications, 1999. (MOMUC '99). 1999 IEEE International Workshop on San Diego, CA, USA, IEEE, US, Nov. 15, 1999, pp. 43-50, XP010370695, ISBN:0-7803-5904-6.

Nogueroles, R. et al.: "Improved Performance of a Random OFDMA Mobile Communication System" Vehicular Technology Conference, 1998. VTC 98. 48th IEEE Ottawa, Ontario, Canada, May 18-21, 1998, pp. 2502-2506, XP010288120, ISBN:0-7803-4320-4.

Kinugawa, Y. et al.: "Frequency and Time Division Multiple Access with Demand-Assignment Using Multicarrier Modulation for Indoor Wireless Communications Systems", IEICE Transactions on Communications, Institute of Electronics Information and Comm. Eng. Tokyo, Japan, vol. E77-B, NR. 3, Mar. 1994, pp. 396-402, XP000451014, ISSN:0916-8516.

Bender et al., *CDMA/HDR: A Bandwidth-Efficient High-Speed Wireless Data Service for Nomadic Users*, IEEE Communications Magazine, Jul. 2000, pp. 70-87.

Wong, C.Y., et al., *Multiuser OFDM With Adaptive Subcarrier, Bit, and Power Allocation*, IEEE Journal on Selected Areas in Communications, Oct. 1999, IEEE Inc., New York, USA, vol. 17, Nr. 10, pp. 1747-1758, XP000854075, ISSN: 0733-8716 Sections I and II abstract.

Tsoulos, G.V., *Smart Antennas For Mobile Communication Systems: Benefits And Challenges*, Electronics & Communication Engineering Journal, Apr. 1999, pp. 84-94.

Shad et al., *Indoor SDMA Capacity Using a Smart Antenna Basestation*, 1997 IEEE, pp. 868-872.

Farsakh, Christof and Nossek, Josef A., *On the Mobile Radio Capacity Increase Through SDMA*, no date (after 1997).

Frullone et al., *PRMA Performance in Cellular Environments with Self-Adaptive Channel Allocation Strategies*, IEEE Transactions on Vehicular Technology, Nov. 1996, pp. 657-665 vol. 45, No. 4.

Xu, Guanghan and Li, San-Qi, *Throughput Multiplication of Wireless Lans for Multimedia Services: SDMA Protocol Design*, 1994 IEEE, pp. 1326-1332.

Ward, James and Compton, R. Ted, Jr., *High Throughput Slotted ALOHA Packet Radio Networks with Adaptive Arrays*, IEEE Transactions on Communications, Mar. 1993, pp. 460-470, vol. 41, No. 3.

Farsakh, C. et al., "Maximizing the SDMA Mobile Radio Capacity Increase by DOA Sensitive Channel Allocation", Wireless Personal Communications, Kluwer Academic Publishers, NL, vol. 11, No. 1, Oct. 1999, pp. 63-76, XP000835062, ISSN: 0929-6212.

* cited by examiner

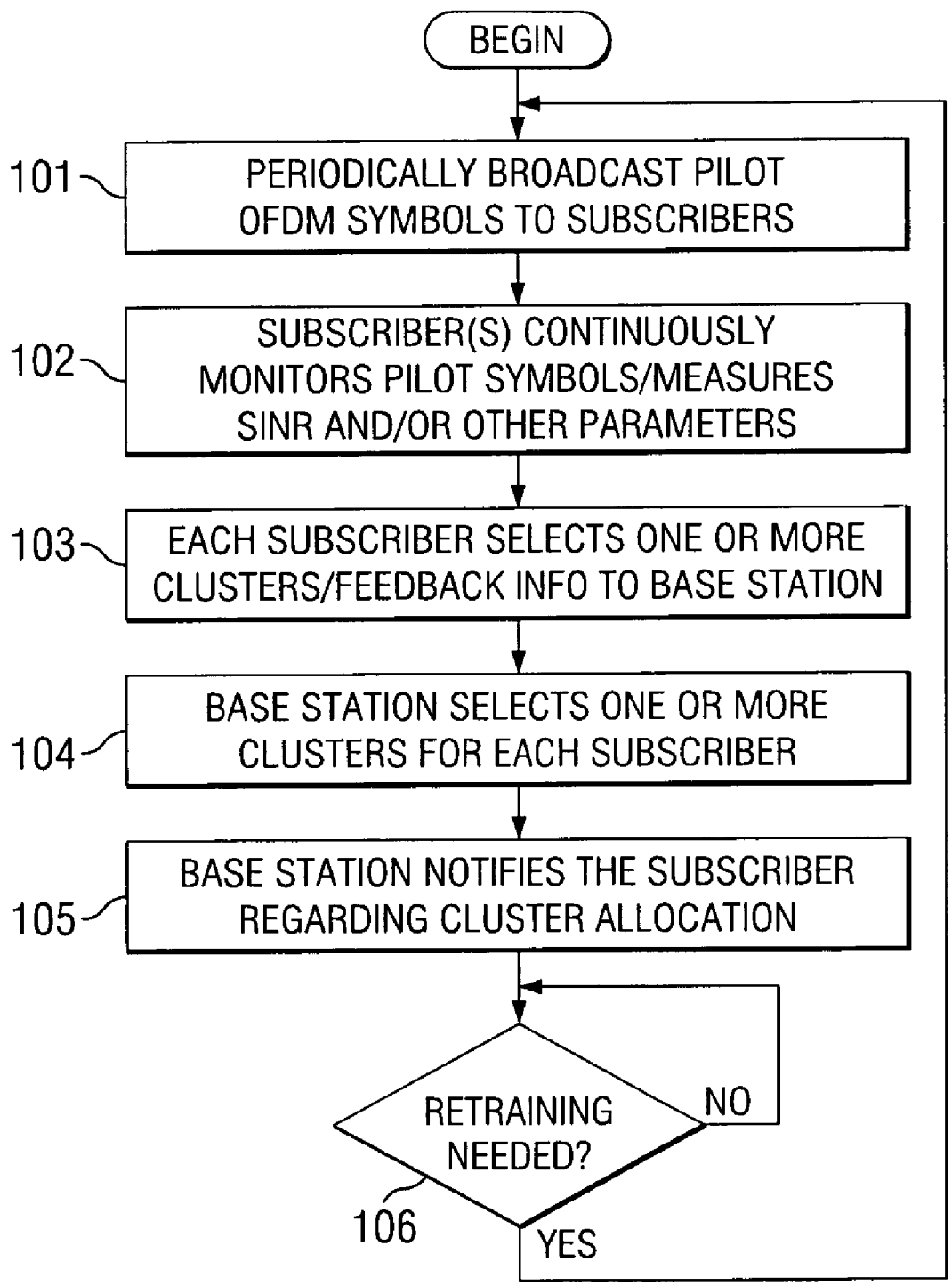

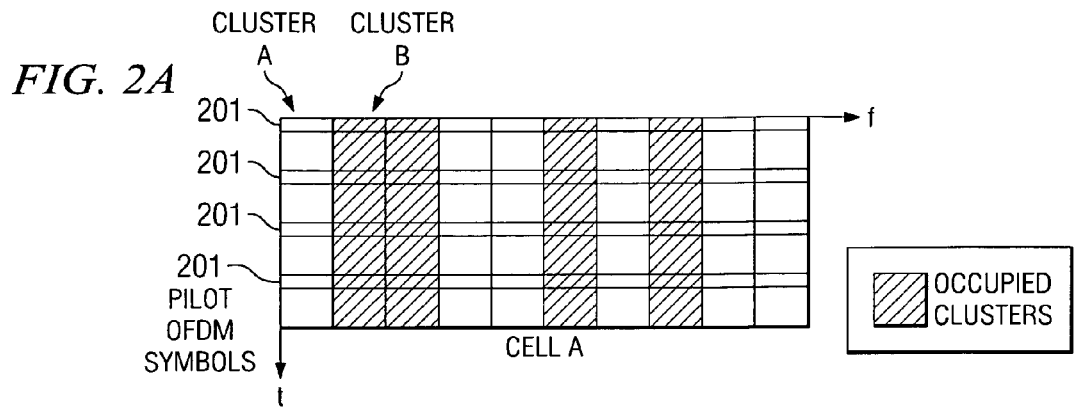
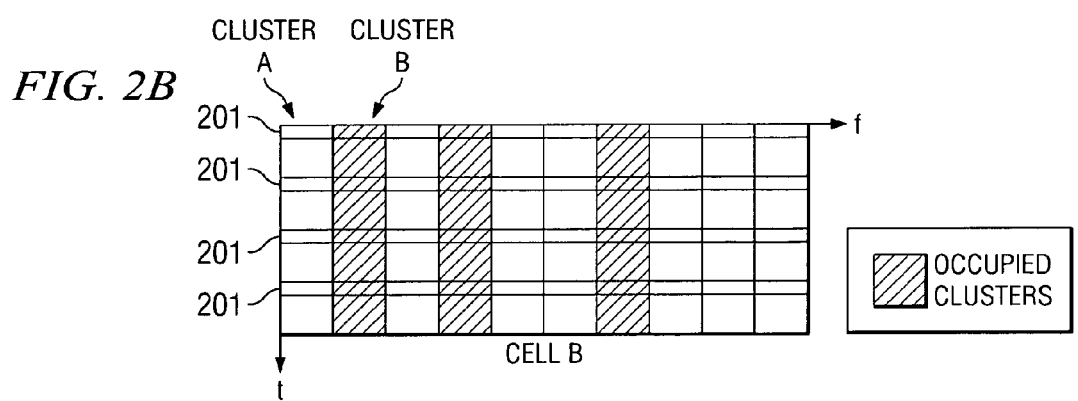
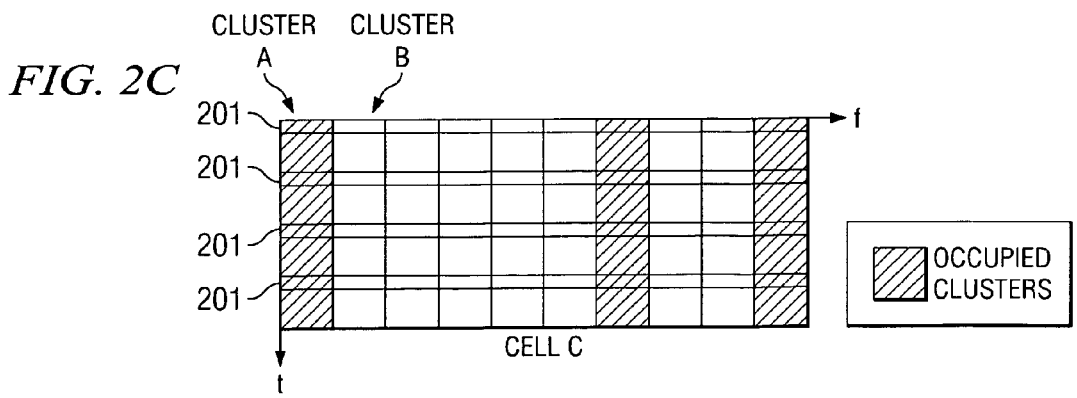

*FIG. 5*

| CLUSTER ID1 | SINR1 | CLUSTER ID2 | SINR2 | CLUSTER ID3 | SINR3 | o o o |
|---|---|---|---|---|---|---|
| 501 | 502 | 503 | 504 | 504 | 504 | |

US 7,164,669 B2

MULTI-CARRIER COMMUNICATION WITH TIME DIVISION MULTIPLEXING AND CARRIER-SELECTIVE LOADING

RELATED APPLICATIONS

This application claims priority to the provisional application titled Multi-Carrier Communication With Time Division Multiplexing And Carrier-Selective Loading, filed Jan. 19, 2001, Ser. No. 60/262,828, which is incorporated by reference herein.

FIELD OF THE INVENTION

The present invention relates to the field of communication systems; more particularly, the present invention relates to multi-subscriber, multi-carrier systems.

BACKGROUND OF THE INVENTION

In a multi-subscriber, single-carrier communication system employing time division multiplexing (TDM), a channel may be shared by multiple subscribers in a time division fashion; that is, the channel may be used by one subscriber at one time and by another subscriber at another time.

The time usage allocation for TDM may be fixed or variable. For fixed usage, each subscriber utilizes the channel at a fixed, pre-scheduled time slot, typically seen in time division multiple access (TDMA) systems. Therefore, no frequent scheduling/rescheduling is needed. However, fixed channel usage may lead to resource waste, especially in bursty packet data transmission, because the subscriber may have nothing to transmit during its assigned time slot. On the other hand, with variable time usage, a channel may be used by one subscriber for a variable period of time (e.g., depending on its data load) and then used by another subscriber. With careful scheduling, variable time usage achieves statistical multiplexing gain and is typically more efficient. For examples of TDM with variable time usage, see Bender, Black, Grob, Padovani, Sindhushayana, and Viterbi, "CDMA/HDR: A Bandwidth-Efficient High-Speed Wireless Data Service for Nomadic Users," IEEE Communications Magazine, Vol. 38, No. 7, pp. 70–77, July, 2000.

In a multi-carrier communication system, each subscriber may be allocated multiple carriers and can use the multiple carriers simultaneously. For a specific subscriber, the transmission rate/reliability (performance) of different carriers may be different. Furthermore, for a specific carrier, the transmission rate/reliability for different subscribers may be different. One example of such is orthogonal frequency division multiple access (OFDMA). In OFDMA, multiple subscribers simultaneously use different frequency subcarriers in a manner similar to frequency division multiple access (FDMA). For more information, see Sari and Karam, "Orthogonal Frequency-Division Multiple Access and its Application to CATV Networks," European Transactions on Telecommunications, Vol. 9 (6), pp. 507–516, November/December 1998 and Nogueroles, Bossert, Donder, and Zyablov, "Improved Performance of a Random OFDMA Mobile Communication System," Proceedings of IEEE VTC'98, pp. 2502–2506.

Due to the unique properties of multi-carrier systems described above, the TDM scheduling algorithms designed for single-carrier systems may not directly apply. This is at least partially because, in a multi-carrier system, unlike in a single-carrier system, the operation of each carrier is to some extent dependent on each other carrier; each carrier impacts each of the others. In a single-carrier system, unlike in a multi-carrier system, there are no complications regarding orderings of packets among carriers. In a multi-carrier system, varying delays associated with multiple carriers introduce complexities unfathomed in a single-carrier system. In a single-carrier system, unlike a multi-carrier system, there needs not be any consideration given toward allocating data packets among more than one carrier. The algorithms needed to potentially optimize overall throughput in a multi-carrier system are inherently different from algorithms used in a single-carrier system.

SUMMARY OF THE INVENTION

A method for subcarrier allocation and loading for a multi-carrier, multi-subscriber system is described. At least one cluster in a first and second set of clusters of subcarriers is associated for use in communication with a first and second subscriber, respectively. Then, for each cluster associated for use in communication with the first subscriber and the second subscriber, usage of that cluster is multiplexed between the first subscriber during a first time division and the second subscriber during a second time division.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a flow diagram of one embodiment of a process for allocating subcarriers.

FIG. 2 illustrates time and frequency grid of OFDM symbols, pilots and clusters.

FIG. 5 illustrates one embodiment of a format for arbitrary cluster feedback.

DETAILED DESCRIPTION

Figure 3:
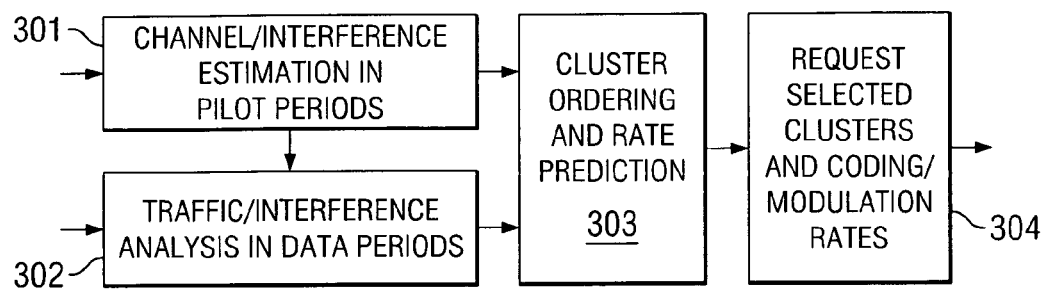
FIG. 3 illustrates subscriber processing.

A high-performance multi-carrier, TDM system, including carrier allocation, carrier loading, TDM signaling, and many other aspects, is disclosed.

The methods disclosed herein are described using the example of OFDMA, where a carrier is corresponding to a cluster, containing multiple OFDM frequency subcarriers. However, it should be noted that the methods are not limited to just OFDMA. The methods directly apply to much more generic multi-carrier systems, where a carrier can be, for example, a frequency cluster in OFDMA, a spreading code in CDMA, an antenna beam in SDMA (space-division multiple access) system, a data stream from one transmit antenna in a multi-input multi-output (MIMO) employing antenna arrays at both the transmit and receiving sides. Indeed, the methods can be applied to a much broader area of data networking systems containing multi-input, multi-output multiplexers (switches) with a property that the transmission rate of each output port depends on the connected input port.

In the following description, numerous details are set forth, to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Exemplary Subcarrier/Cluster Allocation Procedure

FIG. 1 is a flow diagram of one embodiment of a process for allocating clusters to subscribers. The process is performed by processing logic that may comprise hardware (e.g., dedicated logic, circuitry, etc.), software (such as that which runs on, for example, a general purpose computer system or dedicated machine), or a combination of both.

Referring to FIG. 1, each base station periodically broadcasts pilot OFDM symbols to every subscriber within its cell (or sector) (processing block 101). The pilot symbols, often referred to as a sounding sequence or signal, are known to both the base station and the subscribers. In one embodiment, each pilot symbol covers the entire OFDM frequency bandwidth. The pilot symbols may be different for different cells (or sectors). The pilot symbols can serve multiple purposes: time and frequency synchronization, channel estimation and signal-to-interference/noise (SINR) ratio measurement for cluster allocation.

Next, each subscriber continuously monitors the reception of the pilot symbols and measures the SINR and/or other parameters, including inter-cell interference and intra-cell traffic, of each cluster (processing block 102). Based on this information, each subscriber selects one or more clusters with good performance (e.g., high SINR and low traffic loading) relative to each other and feeds back the information on these candidate clusters to the base station through predefined uplink access channels (processing block 103). For example, SINR values higher than 10 dB may indicate good performance. Likewise, a cluster utilization factor less than 50% may be indicative of good performance. Each subscriber selects the clusters with relatively better performance than others. The selection results in each subscriber selecting clusters they would prefer to use based on the measured parameters.

In one embodiment, each subscriber measures the SINR of each subcarrier cluster and reports these SINR measurements to their base station through an access channel. The SINR value may comprise the average of the SINR values of each of the subcarriers in the cluster. Alternatively, the SINR value for the cluster may be the worst SINR among the SINR values of the subcarriers in the cluster. In still another embodiment, a weighted averaging of SINR values of the subcarriers in the cluster is used to generate an SINR value for the cluster. This may be particularly useful in diversity clusters where the weighting applied to the subcarriers may be different.

The feedback of information from each subscriber to the base station contains a SINR value for each cluster and also indicates the coding/modulation rate that the subscriber desires to use. No cluster index is needed to indicate which SINR value in the feedback corresponds to which cluster as long as the order of information in the feedback is known to the base station. In an alternative embodiment, the information in the feedback is ordered according to which clusters have the best performance relative to each other for the subscriber. In such a case, an index is needed to indicate to which cluster the accompanying SINR value corresponds.

Upon receiving the feedback from a subscriber, the base station further selects one or more clusters for the subscriber among the candidates (processing block 104). The base station may utilize additional information available at the base station, e.g., the traffic load information on each subcarrier, amount of traffic requests queued at the base station for each frequency band, whether frequency bands are overused, and how long a subscriber has been waiting to send information. The subcarrier loading information of neighboring cells can also be exchanged between base stations. The base stations can use this information in subcarrier allocation to reduce inter-cell interference.

After cluster selection, the base station notifies the subscriber about the cluster allocation through a downlink common control channel or through a dedicated downlink traffic channel if the connection to the subscriber has already been established (processing block 105). In one embodiment, the base station also informs the subscriber about the appropriate modulation/coding rates.

Once the basic communication link is established, each subscriber can continue to send the feedback to the base station using a dedicated traffic channel (e.g., one or more predefined uplink access channels).

In one embodiment, the base station allocates all the clusters to be used by a subscriber at once. In an alternative embodiment, the base station first allocates multiple clusters, referred to herein as the basic clusters, to establish a data link between the base station and the subscriber. The base station then subsequently allocates more clusters, referred to herein as the auxiliary clusters, to the subscriber to increase the communication bandwidth. Higher priorities can be given to the assignment of basic clusters and lower priorities may be given to that of auxiliary clusters. For example, the base station first ensures the assignment of the basic clusters to the subscribers and then tries to satisfy further requests on the auxiliary clusters from the subscribers. Alternatively, the base station may assign auxiliary clusters to one or more subscribers before allocating basic clusters to other subscribers. For example, a base station may allocate basic and auxiliary clusters to one subscriber before allocating any clusters to other subscribers. In one embodiment, the base station allocates basic clusters to a new subscriber and then determines if there are any other subscribers requesting clusters. If not, then the base station allocates the auxiliary clusters to that new subscriber.

From time to time, processing logic performs retraining by repeating the process described above (processing block 106). The retraining may be performed periodically. This retraining compensates for subscriber movement and any changes in interference. In one embodiment, each subscriber reports to the base station its updated selection of clusters and their associated SINRs. Then the base station further performs the reselection and informs the subscriber about the new cluster allocation. Retraining can be initiated by the base station, and in which case, the base station requests a specific subscriber to report its updated cluster selection. Retraining can also be initiated by the subscriber when it observes channel deterioration.

Adaptive Modulation and Coding

In one embodiment, different modulation and coding rates are used to support reliable transmission over channels with different SINR. Signal spreading over multiple subcarriers may also be used to improve the reliability at very low SINR.

An example coding/modulation table is given below in Table 1.

TABLE 1

| Scheme | Modulation | Code Rate |
| --- | --- | --- |
| 0 | QPSK, ⅛ Spreading | ½ |
| 1 | QPSK, ¼ Spreading | ½ |
| 2 | QPSK, ½ Spreading | ½ |
| 3 | QPSK | ½ |
| 4 | 8PSK | ⅔ |
| 5 | 16QAM | ¾ |
| 6 | 64QAM | ⅚ |

In the example above, ⅛ spreading indicates that one QPSK modulation symbol is repeated over eight subcarriers. The repetition/spreading may also be extended to the time domain. For example, one QPSK symbol can be repeated over four subcarriers of two OFDM symbols, resulting also ⅛ spreading.

The coding/modulation rate can be adaptively changed according to the channel conditions observed at the receiver after the initial cluster allocation and rate selection.

Pilot Symbols and SINR Measurement

In one embodiment, each base station transmits pilot symbols simultaneously, and each pilot symbol occupies the entire OFDM frequency bandwidth, as shown in FIGS. 2A–C. Referring to FIGS. 2A–C, pilot symbols 201 are shown traversing the entire OFDM frequency bandwidth for cells A, B and C, respectively. In one embodiment, each of the pilot symbols have a length or duration of 128 microseconds with a guard time, the combination of which is approximately 152 microseconds. After each pilot period, there are a predetermined number of data periods followed by another set of pilot symbols. In one embodiment, there are four data periods used to transmit data after each pilot, and each of the data periods is 152 microseconds.

A subscriber estimates the SINR for each cluster from the pilot symbols. In one embodiment, the subscriber first estimates the channel response, including the amplitude and phase, as if there is no interference or noise. Once the channel is estimated, the subscriber calculates the interference/noise from the received signal.

The estimated SINR values may be ordered from largest to smallest SINRs and the clusters with large SINR values are selected. In one embodiment, the selected clusters have SINR values that are larger than the minimum SINR which still allows a reliable (albeit low-rate) transmission supported by the system. The number of clusters selected may depend on the feedback bandwidth and the request transmission rate. In one embodiment, the subscriber always tries to send the information about as many clusters as possible from which the base station chooses.

The estimated SINR values are also used to choose the appropriate coding/modulation rate for each cluster as discussed above. By using an appropriate SINR indexing scheme, an SINR index may also indicate a particular coding and modulation rate that a subscriber desires to use. Note that even for the same subscribers, different clusters can have different modulation/coding rates.

Pilot symbols serve an additional purpose in determining interference among the cells. Since the pilots of multiple cells are broadcast at the same time, they will interfere with each other (because they occupy the entire frequency band). This collision of pilot symbols may be used to determine the amount of interference as a worst case scenario. Therefore, in one embodiment, the above SINR estimation using this method is conservative in that the measured interference level is the worst-case scenario, assuming that all the interference sources are on. Thus, the structure of pilot symbols is such that it occupies the entire frequency band and causes collisions among different cells for use in detecting the worst case SINR in packet transmission systems.

During data traffic periods, the subscribers can determine the level of interference again. The data traffic periods are used to estimate the intra-cell traffic as well as the inter-cell interference level. Specifically, the power difference during the pilot and traffic periods may be used to sense the (intra-cell) traffic loading and inter-cell interference to select the desirable clusters.

The interference level on certain clusters may be lower, because these clusters may be unused in the neighboring cells. For example, in cell A, with respect to cluster A there is less interference because cluster A is unused in cell B (while it is used in cell C). Similarly, in cell A, cluster B will experience lower interference from cell B because cluster B is used in cell B but not in cell C.

The modulation/coding rate based on this estimation is robust to frequent interference changes resulted from bursty packet transmission. This is because the rate prediction is based on the worst case situation in which all interference sources are transmitting.

In one embodiment, a subscriber utilizes the information available from both the pilot symbol periods and the data traffic periods to analyze the presence of both the intra-cell traffic load and inter-cell interference. The goal of the subscriber is to provide an indication to the base station as to those clusters that the subscriber desires to use. Ideally, the result of the selection by the subscriber is clusters with high channel gain, low interference from other cells, and high availability. The subscriber provides feedback information that includes the results, listing desired clusters in order or not as described herein.

FIG. 3 illustrates one embodiment of subscriber processing. The processing is performed by processing logic that may comprise hardware (e.g., dedicated logic, circuitry, etc.), software (such as that which runs on, for example, a general purpose computer system or dedicated machine), or a combination of both.

Referring to FIG. 3, channel/interference estimation processing block 301 performs channel and interference estimation in pilot periods in response to pilot symbols. Traffic/interference analysis processing block 302 performs traffic and interference analysis in data periods in response to signal information and information from channel/interference estimation block 301.

Cluster ordering and rate prediction processing block 303 is coupled to outputs of channel/interference estimation processing block 301 and traffic/interference analysis processing block 302 to perform cluster ordering and selection along with rate prediction.

The output of cluster ordering processing block 303 is input to cluster request processing block 304, which requests clusters and modulation/coding rates. Indications of these selections are sent to the base station. In one embodiment, the SINR on each cluster is reported to the base station through an access channel. The information is used for cluster selection to avoid clusters with heavy intra-cell traffic loading and/or strong interference from other cells. That is, a new subscriber may not be allocated use of a particular cluster if heavy intra-cell traffic loading already exists with respect to that cluster. Also, clusters may not be allocated if the interference is so strong that the SINR only allows for low-rate transmission or no reliable transmission at all.

The channel/interference estimation by processing block 301 is well-known in the art by monitoring the interference that is generated due to full-bandwidth pilot symbols being simultaneously broadcast in multiple cells. The interface information is forwarded to processing block 302 which uses the information to solve the following equation:

$$H_i S_i + I_i + n_i = y_i$$

where $S_i$ represents the signal for subcarrier (freq. band) i, $I_i$ is the interference for subcarrier i, $n_i$ is the noise associated with subcarrier i, and $y_i$ is the observation for subcarrier i. In the case of 512 subcarriers, i may range from 0 to 511. The $I_i$ and $n_i$ are not separated and may be considered one quantity. The interference/noise and channel gain $H_i$ are not know. During pilot periods, the signal $S_i$ representing the pilot symbols, and the observation $y_i$ are knowns, thereby allowing determination of the channel gain $H_i$ for the case where there is no interference or noise. Once this is known, it may be plugged back into the equation to determine the interference/noise during data periods since $H_i$, $S_i$ and $y_i$ are all known.

The interference information from processing blocks 301 and 302 are used by the subscriber to select desirable clusters. In one embodiment, using processing block 303, the subscriber orders clusters and also predicts the data rate that would be available using such clusters. The predicted data rate information may be obtained from a look up table with precalculated data rate values. Such a look up table may store the pairs of each SINR and its associated desirable transmission rate. Based on this information, the subscriber selects clusters that it desires to use based on predetermined performance criteria. Using the ordered list of clusters, the subscriber requests the desired clusters along with coding and modulation rates known to the subscriber to achieve desired data rates.

Figure 4:
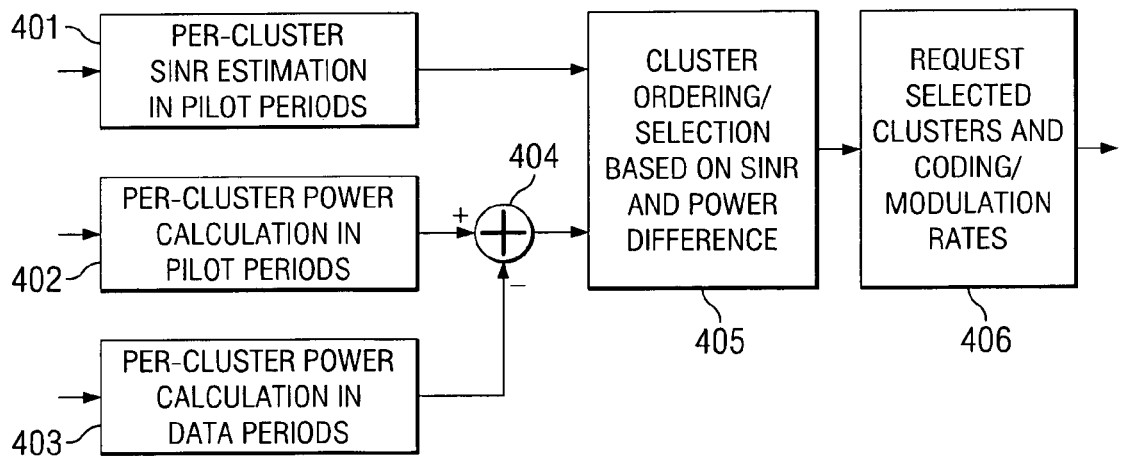
FIG. 4 illustrates one example of FIG. 3.

FIG. 4 is one embodiment of an apparatus for the selection of clusters based on power difference. The approach uses information available during both pilot symbol periods and data traffic periods to perform energy detection. The processing of FIG. 4 may be implemented in hardware, (e.g., dedicated logic, circuitry, etc.), software (such as is run on, for example, a general purpose computer system or dedicated machine), or a combination of both.

Referring to FIG. 4, a subscriber includes SINR estimation processing block 401 to perform SINR estimation for each cluster in pilot periods, power calculation processing block 402 to perform power calculations for each cluster in pilot periods, and power calculation processing block 403 to perform power calculations in data periods for each cluster. Subtractor 404 subtracts the power calculations for data periods from processing block 403 from those in pilot periods from processing block 402. The output of subtractor 404 is input to power difference ordering (and group selection) processing block 405 that performs cluster ordering and selection based on SINR and the power difference between pilot periods and data periods. Once the clusters have been selected, the subscriber requests the selected clusters and the coding/modulation rates with processing block 406.

More specifically, in one embodiment, the signal power of each cluster during the pilot periods is compared with that during the traffic periods, according to the following:

$$P_P = P_S + P_I + P_N,$$

$$P_D = \begin{cases} P_N, & \text{with no signal and interference} \\ P_S + P_N, & \text{with signal only} \\ P_I + P_N, & \text{with interference only} \\ P_S + P_I + P_N, & \text{with both signal and interference} \end{cases}$$

$$P_P - P_D = \begin{cases} P_S + P_I, & \text{with no signal and interference} \\ P_I, & \text{with signal only} \\ P_S, & \text{with interference only} \\ 0, & \text{with both signal and interference} \end{cases}$$

where $P_P$ is the measured power corresponding to each cluster during pilot periods, $P_D$ is the measured power during the traffic periods, $P_S$ is the signal power, $P_I$ is the interference power, and $P_N$ is the noise power.

In one embodiment, the subscriber selects clusters with relatively large $P_P/(P_P-P_D)$ (e.g., larger than a threshold such as 10 dB) and avoids clusters with low $P_P/(P_P-P_D)$ (e.g., lower than a threshold such as 10 dB) when possible.

Alternatively, the difference may be based on the energy difference between observed samples during the pilot period and during the data traffic period for each of the subcarriers in a cluster such as the following:

$$\Delta_i = |y_i^P| - |y_i^D|$$

Thus, the subscriber sums the differences for all subcarriers.

Depending on the actual implementation, a subscriber may use the following metric, a combined function of both SINR and $P_P-P_D$, to select the clusters:

$$\beta = f(SINR, P_P/(P_P-P_D))$$

where $f$ is a function of the two inputs. One example of $f$ is weighted averaging (e.g., equal weights). Alternatively, a subscriber selects a cluster based on its SINR and only uses the power difference $P_P-P_D$ to distinguish clusters with similar SINR. The difference may be smaller than a threshold (e.g., 1 dB).

Both the measurement of SINR and $P_P-P_D$ can be averaged over time to reduce variance and improve accuracy. In one embodiment, a moving-average time window is used that is long enough to average out the statistical abnormity yet short enough to capture the time-varying nature of channel and interference, e.g., 1 millisecond.

Feedback Format for Downlink Cluster Allocation

In one embodiment, for the downlink, the feedback contains both the indices of selected clusters and their SINR. An exemplary format for arbitrary cluster feedback is shown in FIG. 5. Referring to FIG. 5, the subscriber provides a cluster index (ID) to indicate the cluster and its associated SINR value. For example, in the feedback, the subscriber provides cluster ID1 (501) and the SINR for the cluster, SINR1 (502), cluster ID2 (503) and the SINR for the cluster, SINR2 (504), and cluster ID3 (505), and the SINR for the cluster, SINR3 (506), etc. The SINR for the cluster may be created using an average of the SINRs of the subcarriers. Thus, multiple arbitrary clusters can be selected as the candidates. As discussed above, the selected clusters can also be ordered in the feedback to indicate priority. In one embodiment, the subscriber may form a priority list of clusters and sends back the SINR information in a descending order of priority.

Typically, an index to the SINR level, instead of the SINR itself is sufficient to indicate the appropriate coding/modulation for the cluster. For example, a 3-bit field can be used for SINR indexing to indicate 8 different rates of adaptive coding/modulation.

An Exemplary Base Station

The base station assigns desirable clusters of subcarriers to subscribers requesting those clusters. As described above, desired clusters may be indicated by each subscriber in feedback information to the base station. In one embodiment, the availability of the cluster for allocation to a subscriber depends on the total traffic load on the cluster. Therefore, the base station may attempt to select the clusters not only having a SINR higher than that had by other clusters, but also having a traffic load lower that that had by other clusters.

Multiple uplink/downlink clusters can be allocated to one subscriber by the base station. The allocation can be performed during initial channel assignment using the control channel and also using channel assignment control packets sent through the dedicated traffic channel once the link is established between the subscriber and the base station.

An OFDMA-TDM system can be modeled as multi-input, multi-output multiplexer. Each input port is connected to a subscriber with a user data queue, and each output port is connected to an OFDM frequency cluster set with a cluster data queue containing the data (possibly from multiple different users) to be transmitted through the cluster set. Since the SINR of each cluster set is different for different users, this multiplexer has a property that the data rate of each output port is different for different input ports. One task of media access controller (MAC) 605 is to provide intelligence to the multiplexer so that the total system throughput is increased, and potentially maximized, under the constraint that each user's Quality of Service (QoS) (e.g., delay, etc.) requirement is satisfied. The user data queues are time variant due to the nature of packet transmission.

Basic Setup

Figure 6:
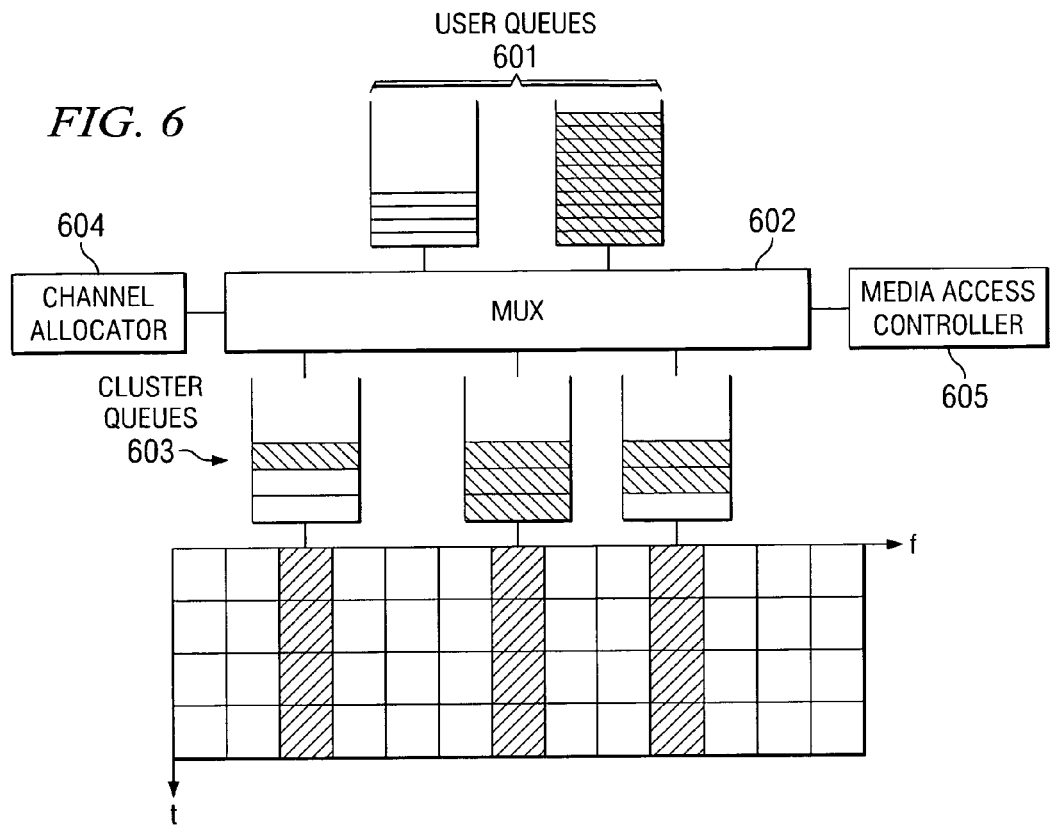
FIG. 6 is a block diagram of one embodiment of a base station of a multi-subscriber, multi-carrier system employing time-division multiplexing.

The base station attempts to assign desirable clusters to each subscriber requesting those clusters. FIG. 6 is a block diagram of one embodiment of a base station. Referring to FIG. 6, user data queues 601 store data transferred from subscribers. In one embodiment, at least one of user data queues 601 is dedicated to each subscriber. The outputs of user data queues 601 are input to multiplexing logic 602. Multiplexing logic 602 is coupled with a channel allocator 604 to allocate clusters of subcarriers to subscribers based on one or more parameters as described herein. Either Channel allocator 604 or media access controller (MAC) 605 also stores the feedback information received from the subscribers. Channel allocator 604 uses the feedback information, from the subscribers, that indicates the clusters of subcarriers that the subscribers desire to use. Channel allocator 604 examines the clusters designated by each subscriber and makes an allocation. The allocation may be based on a load on each one of the clusters. In one embodiment, channel allocator 604 performs the allocation as each new user joins the cell.

Each output of multiplexing logic 602 is forwarded to one of cluster data queues 603. In one embodiment, there is a cluster data queue for each cluster. Each one of cluster data queues 603 outputs to transmitter logic of the base station for transmission thereby into the channels (i.e., clusters of subcarriers).

In one embodiment, the base station performs scheduling per cluster, in which the base station puts a queue element for each subscriber (i.e., user) into a time multiplexing queue of a particular cluster that the subscriber is requesting to use but is currently being used by other subscribers. Then, when the cluster becomes available, the base station assigns the cluster to the subscriber (or user) with the highest transmission rate (weighted, for example, by that subscriber's usage time of that cluster, to prevent starvation of other subscribers) among all the subscribers (or users) associated with that cluster. This time multiplexing queue may include multiple queues, each of which is associated with one subscriber. In one embodiment, a weighted transmission rate of each subscriber is obtained by multiplying that subscriber's usage time of that cluster by some constant factor and then subtracting the resulting product from that subscriber's actual transmission rate. In this embodiment, the weighted transmission rate of a subscriber using a cluster for lengthy periods of time will eventually drop, more fairly allowing other subscribers to use the cluster, and reducing overall latency. For example, in an unweighted transmission rate system, if subscriber A and subscriber B are both assigned to cluster X, and subscriber A has a transmission rate of 100 kbps, and subscriber B has a transmission rate of 80 kbps, then subscriber A will always obtain priority to cluster X, starving subscriber B. However, in a weighted transmission rate system, if subscriber A transmits for 2 consecutive seconds on cluster X, and if the constant factor is 15, then subscriber A will have a weighted transmission rate of 100 minus 2 times 15, or 70. Then subscriber B, who has a weighted transmission rate of 80 minus 0 times 15, or 80, will obtain priority to cluster X after the 2 seconds that subscriber A has transmitted.

With time-division multiplexing, multiple subscribers can share the use of a cluster. In one embodiment, the amount of sharing depends on the subscriber activity factor—the time percentage that the subscriber is actively transmitting on a cluster. In one embodiment, for example, eight subscribers may share a cluster. Each subscriber may obtain a portion of the cluster usage.

In one embodiment, the availability of a cluster to a subscriber depends on a total traffic load on that cluster. Therefore, the base station may attempt to select those clusters not only having a SINR for a subscriber higher than that had by other clusters, but also having a traffic load lower than that had by other clusters. Traffic load may be measured in terms of the length, or fullness, of a queue associated with a cluster. In selecting clusters, the base station may, in one embodiment, combine the SINR metric with the fullness of a queue associated with each cluster. In such a situation, by balancing the length of the queues to be more even, the base station is able to perform load balancing.

User and Cluster Data Queues

Each one of user data queues 601 stores a user's (i.e., subscriber's) data packets. Each cluster may be divided into data segments. A data segment is a portion of data that can be transmitted during a time division of a cluster (i.e., a frame of time for a range of frequencies). Because each subscriber's transmission rate for a particular cluster may differ, the amount of data that may be "loaded" into a single data segment will differ for each subscriber per each cluster. This amount of data that may be "loaded," or, in other words, that can "fit," into a cluster may be referred to as that cluster's size. Each one of cluster data queues 603 stores data segments that are to be transmitted through a cluster associated with that cluster data queue. Each data segment stored in one of cluster data queues 603 fits (i.e., adjusting the amount of data loaded for each subscriber's transmission rate for that cluster, the data loaded into each data segment can be transmitted over a predetermined period of time) into one cluster over one-frame duration (e.g., 10 ms) according to each cluster's transmission rate for that particular user (i.e., subscriber). In other words, the data segments are time-aligned along the frame boundaries. As used herein, a frame means one time slot. As described above, the size of a data segment within a cluster may vary between subscribers as that cluster's transmission rate varies between subscribers.

Media access controller 605 (MAC) segments the user data packets from user data queues 601 into data segments, each data segment having the correct size based on that cluster's transmission rate for the subscriber from which the user data packets originate, at the transmitter, and reassembles the cluster segments back into user data packets at the receiver.

In one embodiment, it is unnecessary to copy the content of user data queues 601 to cluster data queues 603. Instead, in one embodiment, MAC 605 stores a data structure for each data segment, including the index of the intended user, the modulation rate, and the data pointer of the segment in the user data packet queue. According to one embodiment, this data structure contains that the only information needed by the physical layer for the transmission of each data segment.

The Multi-Subscriber Multi-Cluster Transmission-Rate Table

In one embodiment, MAC 605 maintains a multi-subscriber, multi-cluster transmission rate table. It is apparent that this and other tables described herein are so described as a way of conceptualizing the structure of data stored in the base station, such as within a memory (e.g., RAM), and the actual physical representation and orientation of such stored data needs not assume a tabular form. The multi-subscriber, multi-cluster transmission-rate table contains a transmission rate index for each subscriber associated with each cluster. Each transmission rate is based on a combination of modulation and error-correcting coding methods. For example, 8 indices (e.g., 0–7) can be used to indicate 8 different transmission rates. MAC 605 maintains the table at the base station for each sector in a cell. Initially, MAC 605 resets (i.e., sets to a neutral initial value such as zero) every element in the multi-user multi-cluster transmission rate table and then updates the table during any user (i.e., subscriber) connection or during retraining. MAC 605 resets the row (i.e., sets each column in the row to a neutral value such as zero) for a subscriber after the subscriber disconnects.

In one embodiment, the table size may be reduced. For example, MAC 605 may only maintain rows for active subscribers, rather than for the entire subscriber pool.

An exemplary multi-subscriber, multi-cluster transmission table, including cluster allocation information, maintained at a base station, is given below in Table 2:

TABLE 2

| | Cluster 0 | Cluster 1 | Cluster 2 | Cluster 3 | Cluster 4 | Cluster 5 | Cluster 6 | Cluster 7 |
|---|---|---|---|---|---|---|---|---|
| User 0 | 2 | 3 | 0 | 0 | 0 | 0 | 0 | 0 |
| User 1 | 0 | 4 | 0 | 6 | 5 | 2 | 0 | 0 |
| User 2 | 0 | 0 | 0 | 0 | 3 | 4 | 2 | 0 |

TABLE 2-continued

| | Cluster 0 | Cluster 1 | Cluster 2 | Cluster 3 | Cluster 4 | Cluster 5 | Cluster 6 | Cluster 7 |
|---|---|---|---|---|---|---|---|---|
| User 3 | 2 | 0 | 0 | 0 | 4 | 0 | 0 | 3 |

In Table 2, the modulation rate "0" indicates that the cluster corresponding to that column is not allocated to the subscriber/user. A rate greater than zero indicates that the cluster is allocated to the subscriber, and the number is the subscriber's transmission rate for that cluster, if the cluster is actually used by the subscriber.

Cluster Allocation

In one embodiment, cluster allocation is achieved through progressive allocation. A cluster set may be assigned to each user (i.e., subscriber) during that user's access or paging response time. As referred to herein, progressive allocation means that the allocation for each subscriber can be increased after the initial assignment depending on that subscriber's requested data rate (e.g., bandwidth), as well as the fullness of that subscriber's user data queue.

In one embodiment, cluster allocation may be based on a combination of instantaneous delay measurement and statistical traffic load balancing. Exemplary algorithms incorporating instantaneous and statistical measurement and balancing are described in further detail below.

In one embodiment, cluster allocation uses the SINR for a subscriber for a particular cluster in combination with a loading factor for that subscriber and cluster, as opposed to using the SINR alone. The SINR determines the transmission rate if a cluster is used by a subscriber. The loading factor, or, in other words, the occupancy probability, is the probability that the cluster may be used by the subscriber in an environment in which clusters are shared among multiple subscribers through time division multiplexing (TDM).

In one embodiment, cluster allocation includes mixing different data traffic having different Quality of Service (QoS) requirements together. This increases, and potentially maximizes, the use of the clusters while satisfying the QoS requirements of different subscribers. Combined with intelligent cluster loading, described below, this allocation technique increases, and potentially optimizes, throughput and QoS. For example, if one cluster is allocated to two subscribers, one subscriber communicating data used in real-time voice applications and another subscriber communicating data used in non-real-time email applications, then the subscriber communicating data used in real-time applications receives higher priority to cluster usage, while the subscriber communicating data used in non-real-time applications only transmits during the packet transmission gaps of the first subscriber.

In one embodiment, cluster allocation includes retraining. In retraining, the allocation for each subscriber is periodically modified to improve, and potentially optimize, performance. Combined with load balancing, this also indirectly serves as automatic interference avoidance, because any clusters experiencing strong interference will likely build up a long queuing delay and will likely be used less after retraining.

Cluster Allocation Algorithm 1—Short-Term-Delay Based

In one embodiment, the algorithm used to allocated one or more clusters to one or more subscribers is based on short-term, or instantaneous, delay. Mobile feedback information transmitted over the access channel contains the SINR information of N selectively reported clusters. In one embodiment, based on the feedback information and the fullness of each one of cluster data queues 603 (or the transmission time of the residue load), the base station selects M clusters out of the reported N clusters based on the following principle, where M is a predefined bandwidth request parameter for the subscriber. For notation simplicity without loss of generality, the following example assumes M=3. Then the base station chooses clusters $$(i, j, k) = \min_{i,j,k} \frac{P + D_i R_i + D_j R_j + D_k R_k}{R_i + R_j + R_k},$$

where P is the size of the subscriber's user data queue at the moment of assignment. $D_i$, $D_j$, $D_k$ are the residue transmission times of clusters i, j, k and $R_i$, $R_j$, $R_k$ are the subscribers's transmission rates over clusters i, j, k. The above equation may be said to provide an instantaneous transmission delay for the selected clusters. Such an instantaneous transmission delay may be similarly calculated for any subset of clusters. The goal is to reduce, and potentially minimize, the instantaneous transmission delay of the subscriber for which the cluster allocation is performed.

There are a few particularly interesting cases. If M=1, then only one cluster is assigned to the user. The equation notation simplifies to $$i = \min_i \left\{ D_i + \frac{P}{R_i} \right\},$$

and the goal is to reduce, and potentially minimize, the total transmission delay over the cluster for the subscriber.

Another interesting case emerges when there exist equal transmission rates for all of the N clusters. In this case, the equation notation simplifies to $$(i, j, k) = \min_{i,j,k} \{D_i + D_j + D_k\}.$$

Finally, $P \gg D_n R_n$, n=1, ..., N. Then $$(i, j, k) = \max_{i,j,k} \{R_i + R_j + R_k\}.$$

Namely, for a very long user data queue or continuous transmission, the base station chooses the clusters with the highest transmission rates.

While providing theoretical guidance, the above formulas may be modified to take data segment granularity into consideration. For example, for very short user data queues 601 (e.g., a data queue containing only one data packet of 1 kb), containing data that are unlikely to completely fill a single data segment of a cluster, the algorithm seeks to choose the cluster with the shortest residue time.

Furthermore, the instantaneous queue status, fully characterized by $D_i$, i=1, ..., N, can be different during cluster assignment (i.e., allocation) and actual cluster loading. Loading occurs when a data packet is present in a user data queue associated with a cluster. For example, for a mobile initiated connection, there might be no downlink packets during cluster assignment. In this case, the following long-term traffic statistics for cluster assignment can be used.

Cluster Allocation Algorithm 2—Long-Term Load Balancing

It can be seen that $D_n \leftarrow \overline{D}_n$, $P \leftarrow \overline{P}_n$, where $\overline{D}_n$ is a statistical value of the delay measurement (e.g., an average value or a typical value), and $\overline{P}_n$ is a statistical value of the size of a user data queue of the subscriber (e.g., an average value or a typical value). In one embodiment, therefore, the instantaneous delay measurement of the short-term-delay-based formula is replaced by a statistical delay, and the instantaneous queue size is replaced with a statistical queue size.

Cluster Allocation Algorithm 3—Long-Term Load Balancing

In one embodiment, a more simplified algorithm adjusts the transmission rate $R_n' = R_n * \eta$, where $\eta$ is the loading factor—the probability that the subscriber will have the chance to utilize the cluster. Those clusters are selected that have relatively large adjusted transmission rates $R_n'$.

Cluster Loading

As stated above, loading occurs when a data packet is present in a user data queue associated with a cluster. In one embodiment, cluster loading includes MAC 605 delivering user data packets in order, even in a multi-cluster environment. In one embodiment, cluster loading may be preemptive, meaning that a subscriber currently allocated to use a cluster may be diverted away from that cluster if a different subscriber having a higher priority (e.g., due to a higher QoS requirement) is associated with the cluster at some time. In another embodiment, cluster loading is non-preemptive, maintaining a first-in, first-out behavior in each cluster queue. In yet another embodiment, cluster loading incorporates capacity maximization and fairness weighting for each subscriber. In other embodiments, cluster loading may incorporate a combination of two or more of these algorithms. Each of these aspects of cluster loading is described in further detail below.

From the table described above (the multi-subscriber, multi-cluster transmission table), MAC 605 can perform cluster loading. Cluster loading includes transmitting data from user data queues 601 and filling the data segment (one-frame worth of data) of each cluster. In one embodiment, cluster loading uses an algorithm that attempts to maximize the overall system throughput. In one embodiment, cluster loading uses an algorithm that attempts to maintain a QoS requirement for each subscriber and user data queue. In one embodiment, cluster loading uses an algorithm that attempts to produce fairness; that is, to prevent data packets from user data queues having lower transmission rates than other user data queues allocated to the same cluster from languishing (i.e., starving) due to uninterrupted usage by the other data queues; such an algorithm uses weighted transmission rates, described herein. In other embodiments, cluster loading uses combinations of two or more of these algorithms.

Loading: Scheduling and Packet Ordering

After cluster allocation, the base station MAC 605 may use part or all of the clusters assigned to a subscriber for the transmission of data from that subscriber's user data queues. This is called loading.

When MAC 605 needs to send data to multiple subscribers and these subscribers have been allocated overlapping cluster sets (i.e., a cluster has been allocated to multiple subscribers), the order in which MAC 605 should load from different user data queues 601 must be determined. There are several possible loading orders which could be used. In one embodiment, data is loaded from each user data queue to which the cluster is allocated in a "round robin" manner. In another embodiment, data is loaded from user data queues of a subscriber having a transmission rate higher than that had by any other subscriber to which the cluster is allocated before data is loaded from the user data queues of the other subscribers, having lower transmission rates, to which that cluster is also allocated. In one embodiment, a modified version of this transmission rate scheme, in which the transmission rates are weighted by usage time (as described above), is used to determined loading order. In one embodiment, loading order is based on a QoS requirement of each subscriber or user data queue to which the cluster is allocated. As stated above, data having relaxed delay requirements may be mixed in a cluster with data having stringent delay requirements so that gaps in transmission may be filled, increasing, and potentially maximizing, capacity and cluster usage. In other embodiments, loading order is determined using combinations of two or more of these schemes.

During loading, when it becomes a subscriber's turn to use the set of clusters, and if at least one data packet is present in that subscriber's user data queues, then MAC 605 converts those data packets into data segments suitable for physical layer transmission and "loads" the segments into the cluster queue.

In-Order Delivery of User Data Packets

To simplify the upper layers of network design, it is often desirable for MAC 605 to deliver the user data packets in order. This is relatively simple if each mobile unit or subscriber only maintains one data packet queue. In that case, when it is a mobile unit's or subscriber's turn to use its assigned clusters, MAC 605 fetches the data from the mobile unit's or subscriber's user data queue and reassembles/load the segments as follows. MAC 605 attempts to load the data segments having the lowest delays for that subscriber first. Then, if the delays are the same, MAC 605 loads the data segments based on the cluster indices of the data segments, from smallest to largest. In this manner, the data packet sequence of one subscriber is automatically ordered.

User Priorities and Preemptiveness

A wireless network may operate at oversubscription mode during peak hours. In this situation, it is desirable to at least maintain the quality of service requirements of users with high subscription fees. Some applications may have higher QoS requirement than others, even when used by the same subscriber. To ensure QoS, priority-based preemptive operations may be implemented. However, preemptive transmission of packets with high priority can cause serious problems in data packet ordering. According to one embodiment, one solution maintains only one data segment in each cluster queue. That is, the data segments are formed online for the next physical layer transmission frame.

Figure 7:
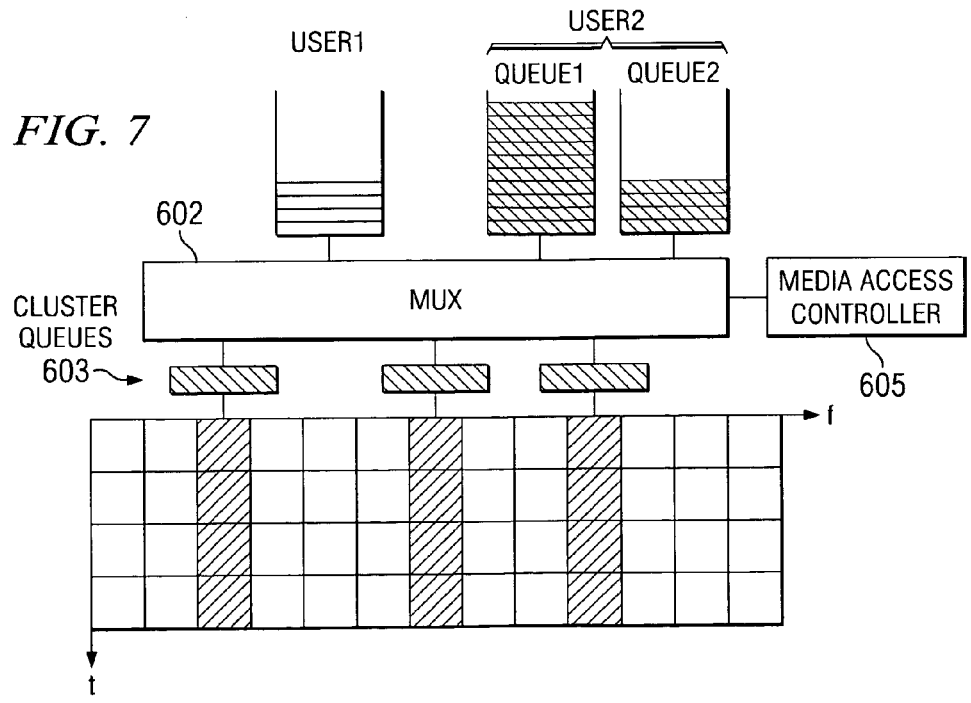
FIG. 7 is a block diagram of another embodiment of a base station with single-segment cluster queues.

FIG. 7 is a block diagram of another embodiment of a base station with single-segment cluster queues. Referring to FIG. 7, two users share three clusters. User 2 has higher priority. There are two user data queues, Queue 1 and Queue 2, for User 2, among which Queue 2 has higher priority. According to one embodiment, MAC 605 first forms the data segments from Queue 2 and then from Queue 1. For each queue, the packets are delivered in order.

The data segments for different users are distinguished by an embedded user index. According to one embodiment, one data segment only contains the data for one subscriber. Padding may be used if there is no sufficient user data.

The packets from different user data queues of the same subscriber can be concatenated in one segment. In one embodiment, different packet header patterns are used to distinguish the data packets from the different user data queues.

TDM Signaling

During cluster allocation at the initial connection setup, the base station informs the subscriber of the subscriber's allocated cluster indices and the subscriber's TDM index for each allocated cluster. TDM indices can be different for different clusters allocated to the same subscriber. This allows flexible use of clusters among multiple subscribers with overlapping cluster allocation, as indicated Table 2 above.

In one embodiment, in cluster assignment carried over the downlink control channel, MAC 605 specifies, for each assigned cluster, the cluster index, the TDM index for the subscriber (3 bits if a maximum of 8 users are allowed to share a cluster, including dedicated usage, according to one embodiment), and the initial modulation rate.

In one embodiment, the TDM index is embedded in each data segment. In one embodiment, the base station transmits a preamble indicating the intended receiver's TDM index. This is referred to as explicit TDM indexing. The preamble is a special, short transmission preceding the regular data transmission. The index may be further encoded to improve reliability and provide error protection. Each subscriber constantly monitors each of its assigned clusters and delivers the data segments to the upper layer if the TDM index, contained in the preamble, matches that subscriber's own TDM index for the cluster. Thus, although all data segments may be received by every subscriber, by using explicit TDM indexing, data segments intended for a subscriber other than the recipient are not delivered to the upper layer.

Table 3 below gives an example of TDM indexing and the corresponding coding method. Coding introduces redundancy, and, therefore, improves error protection.

TABLE 3

| Cluster Designation | TDM Index | Coding    |
|---------------------|-----------|-----------|
| Dedicated/Broadcast | 000       | 0000 0000 |
| User 1              | 001       | 0101 0101 |
| User 2              | 010       | 0011 0011 |
| User 3              | 011       | 0110 0110 |
| User 4              | 100       | 0000 1111 |
| User 5              | 101       | 0101 1010 |
| User 6              | 110       | 0011 1100 |
| User 7              | 111       | 0110 1001 |

Figure 8:
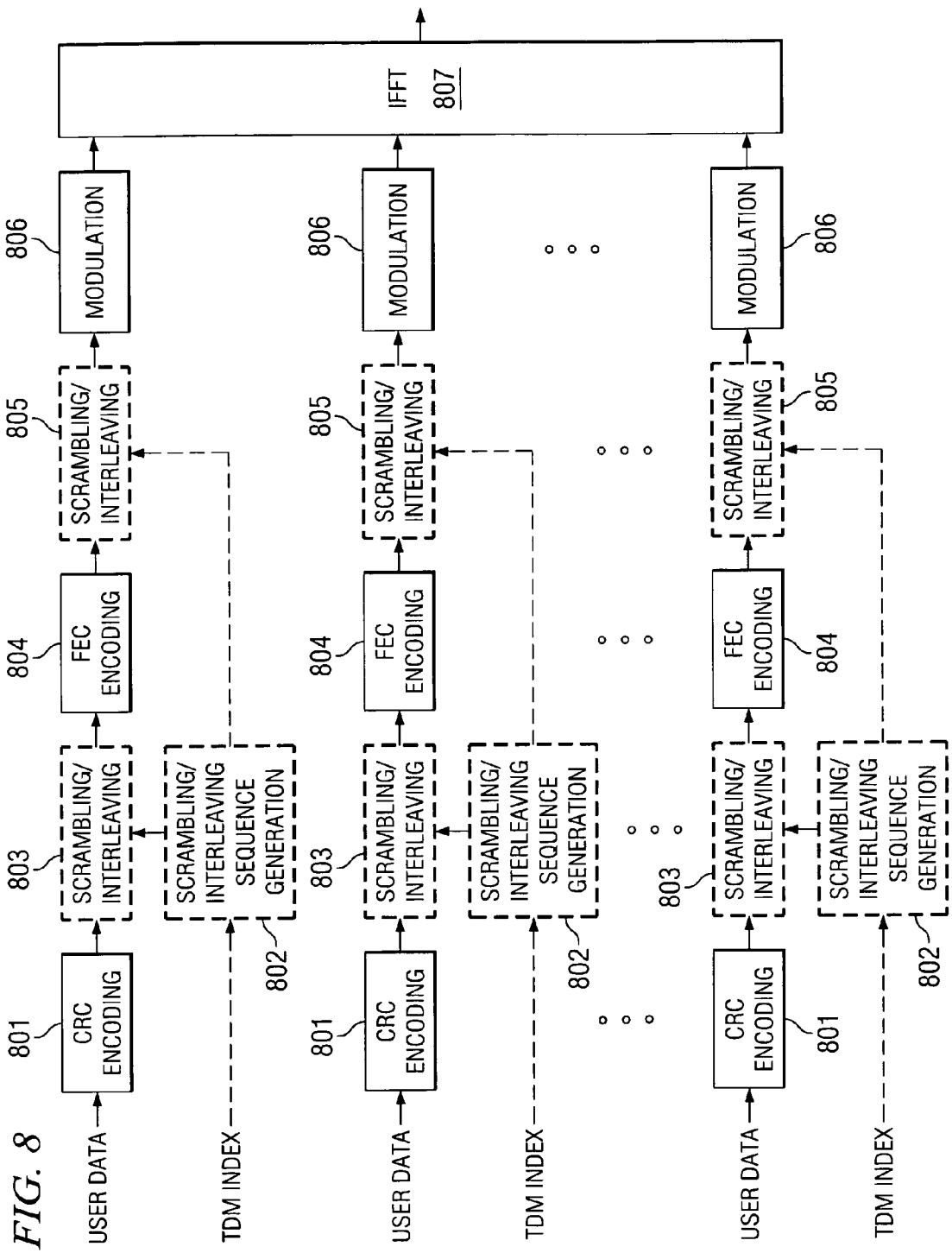
FIG. 8 is a block diagram of one embodiment of a transmitter.
Figure 9:
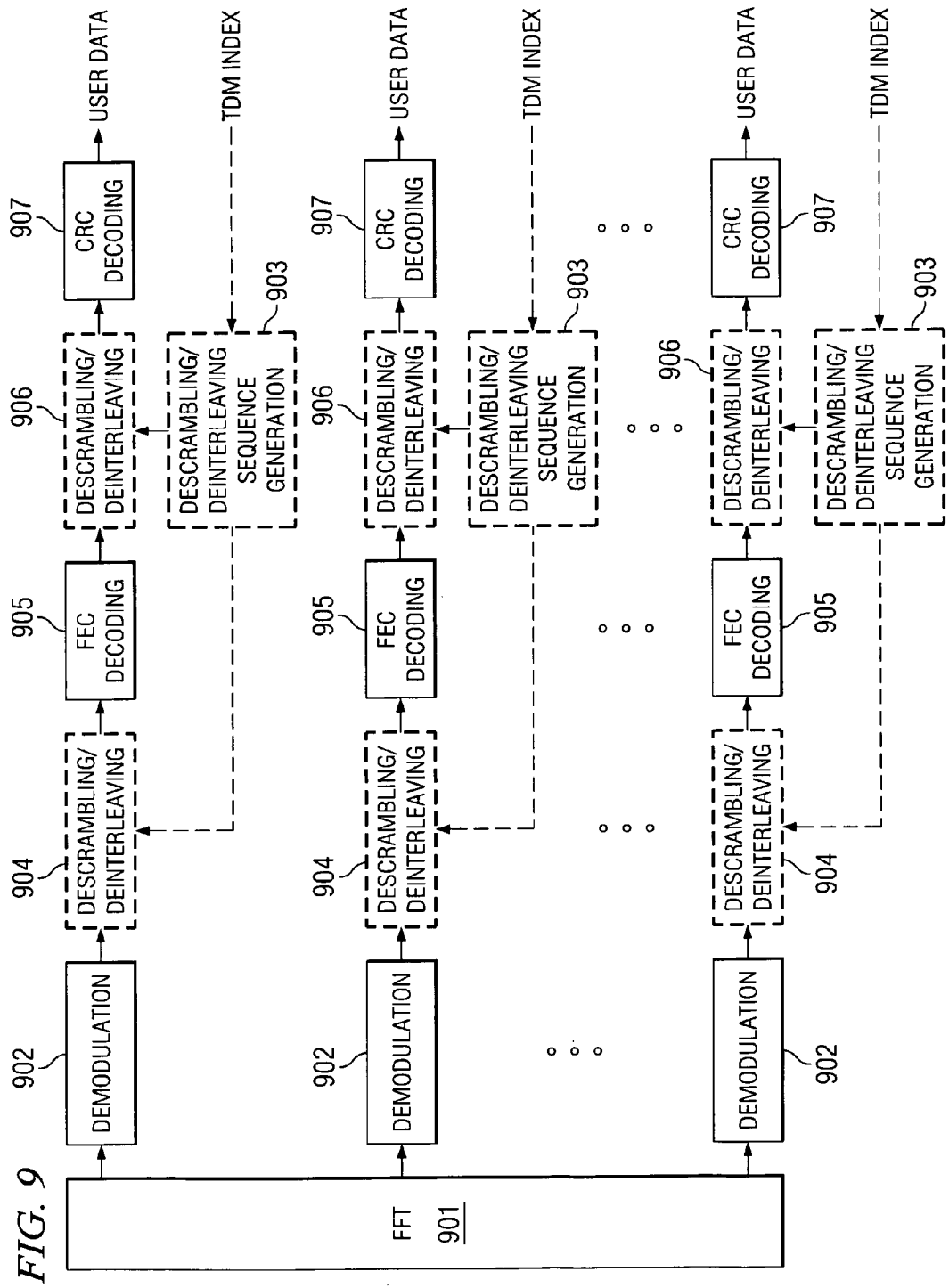
FIG. 9 is a block diagram of one embodiment of a receiver.

In another embodiment, as shown in FIGS. 8 and 9, different data scrambling is used for different TDM indices at the transmitter. This is referred to as implicit TDM indexing.

FIG. 8 is a block diagram of one embodiment of a transmitter. At the transmitting side, data is scrambled using the sequence corresponding to the intended recipient subscriber's TDM index. In one embodiment, this scrambling is accomplished by performing a bit-wise exclusive OR (XOR) operation between the sequence and the data.

Referring to FIG. 8, processing block 801 performs cyclical redundancy check (CRC) encoding on the user data. Processing block 802 performs scrambling/interleaving sequence generation on the TDM index. Processing block 803 performs scrambling/interleaving on the user data. The sequence generated in processing block 802 is used to scramble and interleave the user data in processing block 803. Processing block 804 performs forward error correction (FEC) encoding on the user data. Processing block 805, performs scrambling/interleaving on the user data. The sequence generated in processing block 802 is used to scramble and interleave the user data in processing block 805. Processing block 806 performs modulation on the user data. Processing block 807 performs inverse fast Fourier transform (IFFT) on the user data. Each of the above processing blocks may be implemented as software code stored on a machine-readable medium, as an application-specific integrated circuit (ASIC), or as a digital signal processor (DSP).

FIG. 9 is a block diagram of one embodiment of a receiver. At the receiving side, each subscriber descrambles its received data using the sequence corresponding to that subscriber's TDM index. In one embodiment, the sequence may be generated by a random number generator using the TDM index as a seed. The scrambling sequences are different for different TDM indices. Therefore, only the intended subscriber can receive the data correctly and pass the data to upper layer. For other subscribers for whom the data was not intended, the descrambled data cannot pass a cyclical redundancy check (CRC) and therefore may be silently discarded. The two TDM indexing methods, explicit and implicit, can be used together to ensure correct indexing of the cluster usage.

Referring to FIG. 9, processing block 901 performs fast Fourier transform (FFT) on the user data. Processing block 902 performs demodulation on the user data. Processing block 903 performs descrambling/deinterleaving sequence generation using the TDM index. Processing block 904 performs descrambling/deinterleaving on the user data. The sequence generated in processing block 903 is used to descramble and deinterleave the user data in processing block 904. Processing block 905 performs FEC decoding. Processing block 906 performs descrambling/deinterleaving on the user data. The sequence generated in processing block 903 is used to descramble and deinterleave the user data in processing block 906. Processing block 907 performs CRC decoding on the user data. Each of the above processing blocks may be implemented as software code stored on a machine-readable medium, as an application-specific integrated circuit (ASIC), or as a digital signal processor (DSP).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for subcarrier allocation and loading for a multi-carrier, multi-subscriber system, comprising:

associating at least one cluster in a first set of clusters of subcarriers for use in communication with a first subscriber;

associating at least one cluster in a second set of clusters of subcarriers for use in communication with a second subscriber; and for each cluster associated for use in communication with the first subscriber and the second subscriber, multiplexing a usage of said each cluster between the first subscriber during a first time division and the second subscriber during a second time division, wherein multiplexing includes assigning said each cluster to a one of the first subscriber and the second subscriber that has a highest transmission rate of transmission rates of subscribers associated with said each cluster.

2. The method of claim 1, wherein the transmission rates are weighted.

3. The method of claim 2, wherein each one of the transmission rates is weighted based on a proportion of time that a subscriber has transmitted on said each cluster.

4. A method for subcarrier allocation and loading for a multi-carrier, multi-subscriber system, comprising:
associating at least one cluster in a first set of clusters of subcarriers for use in communication with a first subscriber;
associating at least one cluster in a second set of clusters of subcarriers for use in communication with a second subscriber; and
for each cluster associated for use in communication with the first subscriber and the second subscriber, multiplexing a usage of said each cluster between the first subscriber during a first time division and the second subscriber during a second time division,
wherein multiplexing includes assigning said each cluster to a one of the first subscriber and the second subscriber based on a probability that the cluster will be used by the first subscriber and a probability that the cluster will be used by the second subscriber.

5. A method for subcarrier allocation and loading for a multi-carrier, multi-subscriber system, comprising;
associating at least one cluster in a first set of clusters of subcarriers for use in communication with a first subscriber;
associating at least one cluster in a second set of clusters of subcarriers for use in communication with a second subscriber; and
for each cluster associated for use in communication with the first subscriber and the second subscriber, multiplexing a usage of said each cluster between the first subscriber during a first time division and the second subscriber during a second time division,
wherein associating at least one cluster in the first set for use in communication with the first subscriber includes selecting the at least one cluster based on a SINR and a traffic load of each one of the at least one cluster.

6. The method of claim 5, wherein the traffic load of each one of the at least one cluster is a queue fullness of a queue associated with that one of the at least one cluster.

7. The method of claim 5, wherein selecting the at least one cluster based on a SINR and a traffic load of each one of the at least one cluster includes balancing lengths of queues associated with each one of the at least one cluster.

8. A method for subcarrier allocation and loading for a multi-carrier, multi-subscriber system, comprising:
associating at least one cluster in a first set of clusters of subcarriers for use in communication with a first subscriber;
associating at least one cluster in a second set of clusters of subcarriers for use in communication with a second subscriber; and
for each cluster associated for use in communication with the first subscriber and the second subscriber, multiplexing a usage of said each cluster between the first subscriber during a first time division and the second subscriber during a second time division,
wherein multiplexing includes assigning said each cluster to a one of the first subscriber and the second subscriber based on a quality of service requirement of the first subscriber and a quality of service requirement of the second subscriber.

9. The method of claim 8, wherein assigning includes allocating said each cluster to a one of the first subscriber and the second subscriber having a lower quality of service requirement than that had by another one of the first subscriber and the second subscriber during periods of time in which a one of the first subscriber and the second subscriber having a higher quality of service requirement than that had by another one of the first subscriber and the second subscriber does not transmit on said each cluster.

10. A method for subcarrier allocation and loading for a multi-carrier, multi-subscriber system, comprising:
associating at least one cluster in a first set of clusters of subcarriers for use in communication with a first subscriber;
associating at least one cluster in a second set of clusters of subcarriers for use in communication with a second subscriber; and
for each cluster associated for use in communication with the first subscriber and the second subscriber, multiplexing a usage of said each cluster between the first subscriber during a first time division and the second subscriber during a second time division,
wherein associating at least one cluster in the first set for use in communication with the first subscriber includes selecting a subset of the first set having a least instantaneous delay ratio for the first subscriber of any instantaneous delay ratio for the first subscriber of any subset of the first set.

11. A method for subcarrier allocation and loading for a multi-carrier, multi-subscriber system, comprising:
associating at least one cluster in a first set of clusters of subcarriers for use in communication with a first subscriber;
associating at least one cluster in a second set of clusters of subcarriers for use in communication with a second subscriber; and
for each cluster associated for use in communication with the first subscriber and the second subscriber, multiplexing a usage of said each cluster between the first subscriber during a first time division and the second subscriber during a second time division,
wherein associating at least one cluster in the first set for use in communication with the first subscriber includes selecting a subset of the first set having a least statistical delay ratio for the first subscriber of any statistical delay ratio for the first subscriber of any subset of the first set.

12. A method for subcarrier allocation and loading for a multi-carrier, multi-subscriber system, comprising:
associating at least one cluster in a first set of clusters of subcarriers for use in communication with a first subscriber;
associating at least one cluster in a second set of clusters of subcarriers for use in communication with a second subscriber; and
for each cluster associated for use in communication with the first subscriber and the second subscriber, multiplexing a usage of said each cluster between the first subscriber during a first time division and the second subscriber during a second time division.
wherein multiplexing includes:
loading data associated with the first subscriber into a queue associated with said each cluster upon determining that a data packet is present in a queue associated with the first subscriber; and loading data associated with the second subscriber into the queue associated with said each cluster upon determining that a data packet is present in a queue associated with the second subscriber.

13. The method of claim 12, wherein loading data associated with the first subscriber and loading data associated with the second subscriber includes loading the data associated with a one of the first subscriber and the second subscriber having a higher average transmission rate than that had by another one of the first subscriber and the second subscriber before loading the data associated with a one of the first subscriber and the second subscriber having a lower average transmission rate than that had by another one of the first subscriber and the second subscriber.

14. The method of claim 13, wherein the average transmission rate of the first subscriber and the average transmission rate of the second subscriber are weighted.

15. The method of claim 13, wherein the average transmission rate of the first subscriber is weighted based on a proportion of time that the first subscriber has transmitted on said each cluster and the average transmission rate of the second subscriber is weighted based on a proportion of time that the second subscriber has transmitted on said each cluster.

16. The method of claim 12, wherein loading data associated with the first subscriber and loading data associated with the second subscriber includes loading the data associated with a one of the first subscriber and the second subscriber having a higher quality of service requirement than that had by another one of the first subscriber and the second subscriber before loading the data associated with a one of the first subscriber and the second subscriber having a lower quality of service requirement than that had by another one of the first subscriber and the second subscriber.

17. The method of claim 12, wherein loading data associated with the first subscriber into the queue associated with said each cluster includes loading data into a segment of the queue having a lowest delay of any delay of any segment of the queue.

18. The method of claim 17, wherein loading data associated with the first subscriber into the queue associated with said each cluster includes loading data into a segment of the queue having a smallest cluster index of any cluster index of any segment of the queue.

19. The method of claim 12, wherein loading data associated with the first subscriber into a queue associated with said each cluster includes preempting a loading of data associated with a third subscriber into the queue upon determining that the data associated with the first subscriber has a higher quality of service requirement than that had by the data associated with the third subscriber.

20. The method of claim 12, wherein loading data associated with the first subscriber includes loading data having a highest quality of service requirement of any data associated with the first subscriber before loading other data associated with the first subscriber.

21. A method for subcarrier allocation and loading for a multi-carrier, multi-subscriber system, comprising:

associating at least one cluster in a first set of clusters of subcarriers for use in communication with a first subscriber;

associating at least one cluster in a second set of clusters of subcarriers for use in communication with a second subscriber; and for each cluster associated for use in communication with the first subscriber and the second subscriber, multiplexing a usage of said each cluster between the first subscriber during a first time division and the second subscriber during a second time division, wherein multiplexing includes informing the first subscriber of a first time division multiplexing index, corresponding to the first subscriber, for said each cluster, during an allocation phase.

22. The method of claim 21, wherein multiplexing includes periodically reassigning said each cluster to a one of the first subscriber and the second subscriber.

23. The method of claim 21, wherein associating at least one cluster in the first set for use in communication with the first subscriber includes selecting the at least one cluster based on a bandwidth requirement of the first subscriber.

24. A method for subcarrier allocation and loading for a multi-carrier, multi-subscriber system, comprising:

associating at least one cluster in a first set of clusters of subcarriers for use in communication with a first subscriber;

associating at least one cluster in a second set of clusters of subcarriers for use in communication with a second subscriber; and for each cluster associated for use in communication with the first subscriber and the second subscriber, multiplexing a usage of said each cluster between the first subscriber during a first time division and the second subscriber during a second time division, wherein multiplexing includes embedding a time division multiplexing index, corresponding to the first subscriber, in a segment of said each cluster intended for the first subscriber.

25. The method of claim 24, wherein the time division multiplexing index corresponding to the first subscriber varies between different ones of the clusters.

26. The method of claim 24, wherein embedding the time division multiplexing index includes encoding the time division multiplexing index.

27. A method for subcarrier allocation and loading for a multi-carrier, multi-subscriber system, comprising:

associating at least one cluster in a first set of clusters of subcarriers for use in communication with a first subscriber;

associating at least one cluster in a second set of clusters of subcarriers for use in communication with a second subscriber; and for each cluster associated for use in communication with the first subscriber and the second subscriber, multiplexing a usage of said each cluster between the first subscriber during a first time division and the second subscriber during a second time division, wherein multiplexing includes transmitting, with data intended for the first subscriber that has been loaded into a segment of said each cluster, a preamble for the segment that includes a time division multiplexing index, corresponding to the first subscriber, for said each cluster.

28. The method of claim 27, further comprising:

the first subscriber receiving the data intended for the first subscriber, with the preamble; and upon the first subscriber recognizing the time division multiplexing index included in the preamble as matching a time division multiplexing index received by the first subscriber during an allocation phase, the first subscriber decoding the data and passing the data to an upper layer.

29. A method for subcarrier allocation and loading for a multi-carrier, multi-subscriber system, comprising:
- associating at least one cluster in a first set of clusters of subcarriers for use in communication with a first subscriber;
- associating at least one cluster in a second set of clusters of subcarriers for use in communication with a second subscriber; and
- for each cluster associated for use in communication with the first subscriber and the second subscriber, multiplexing a usage of said each cluster between the first subscriber during a first time division and the second subscriber during a second time division,
- wherein multiplexing includes scrambling data, intended for the first subscriber, using a scrambling sequence corresponding to a time division multiplexing index, corresponding to the first subscriber, for said each cluster.

30. The method of claim 29, further comprising:
- the first subscriber receiving the data intended for the first subscriber; and upon the first subscriber successfully descrambling the data using the scrambling sequence corresponding to a time division multiplexing index received by the first subscriber during an allocation phase, the first subscriber decoding the data and passing the data to an upper layer.

31. A base station, comprising:
- user data queues to store data transmitted from subscribers;
- multiplexing logic coupled with the user data queues to receive feedback information from subscribers, to allocate, based on the feedback information, one or more clusters of subcarriers to each subscriber, and to time division multiplex data from the user data queues into cluster data queues corresponding to those of the clusters allocated to more than one subscriber; and
- the cluster data queues coupled with the multiplexing logic to receive data from the multiplexing logic and store the data for transmission on corresponding clusters of subcarriers.

* * * * *